March 17, 1970   J. HAISMA ET AL   3,501,713
LASER CONSTRUCTION
Filed Sept. 27, 1966

INVENTORS
JAN HAISMA
ADRIAAN LOOIJEN
BY
AGENT

United States Patent Office 3,501,713
Patented Mar. 17, 1970

3,501,713
LASER CONSTRUCTION
Jan Haisma and Adriaan Looijen, Emmasingel, Eindhoven, Netherlands, assignors, by mesne assignments, to U.S. Philips Corporation, New York, N.Y., a corporation of Delaware
Filed Sept. 27, 1966, Ser. No. 582,441
Claims priority, application Netherlands, Oct. 7, 1965, 6512981
Int. Cl. H01s 3/22
U.S. Cl. 331—94.5
4 Claims

ABSTRACT OF THE DISCLOSURE

A detuning device for mounting a reflector onto a cavity of a gaseous discharge laser, which device is formed by a pair of apertured plates separated by a pair of concentric cylinders, the inner being resilient and the outer electrostrictive.

---

Figure 1:
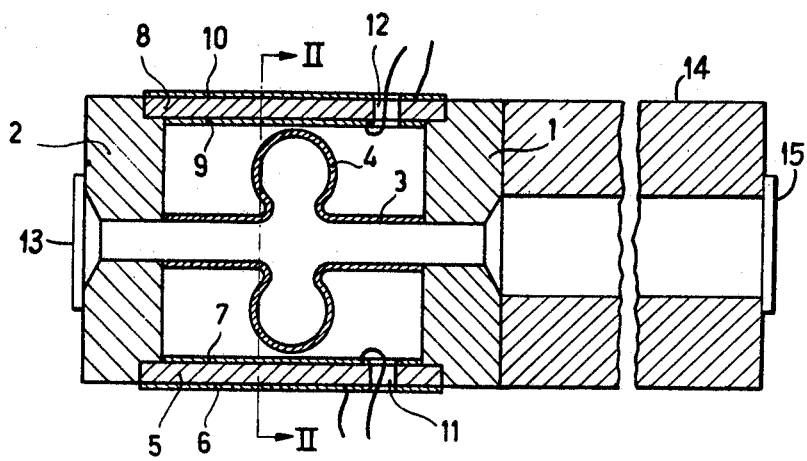

The invention relates to laser construction and particularly to a detuning arrangement for a gas discharge laser.

Laser detuning, including frequency shifting or frequency modulation of an oscillating laser, may be accomplished by displacing or varying the length of the discharge cavity. In a gas discharge laser, the displacement may be provided by a perforated cylindrical body of electrostrictive material inserted between the cavity discharge space and one of the two spaced reflectors. Since electrostrictive material may be made to expand by means of a voltage applied to the terminals thereof, the reflector separation and thus the cavity length may be selectively altered.

An arrangement such as is described above may be found in a pending U.S. application Ser. No. 486,384, filed Sept. 10, 1965 and assigned to the assignee of the present invention. In certain cases, particular care in the construction of this arrangement must be taken to neutralize or minimize any curvature of the body, resulting from electrostriction, which would cause frequency instability as well as possible leaks or contamination of the discharge space gases. In order to prevent gaseous contamination or leaks, a glass tube is secured by means of cement to the central bore of the body of electrostrictive material, thereby further complicating the construction of such a device. Further, to replace the electrostrictive material requires that the discharge space be broken into.

It is therefore a prime object of the invention to provide a novel construction for electrostrictive detuning in a laser.

It is a further object of the invention to provide a laser employing electrostrictive detuning in a manner which will result in minimal effect upon the curvature and seal of the laser cavity.

It is a still further object of the invention to provide a laser construction employing electrostrictive detuning wherein the electrostrictive material may be removed without disturbing or contaminating the discharge space.

In accordance with the invention, a gas discharge laser of the type having a discharge cavity located within a block of insulating material and having reflective cavity terminators is provided with an electrostrictive detuning member including two terminal plates of quartz or glass. Each of the terminal plates contain an aperture and both are interconnected by means of a glass or quartz tube having a widened, resilient central portion and sealed to each of the plates in the approximate area of the aperture. To the outside area of one terminal plate a reflector is secured with optically ground fitting surfaces, while to the outside area of the other terminal plate the discharge duct or cavity in the block of insulating material is affixed. Between the two terminal plates is connected an electrostrictive body which may take the form of a sheath enclosing the periphery of the terminal plates in two or more sections. The sheath is provided with electrodes on inner and outer sides for applying the requisite voltage.

Figure 2:
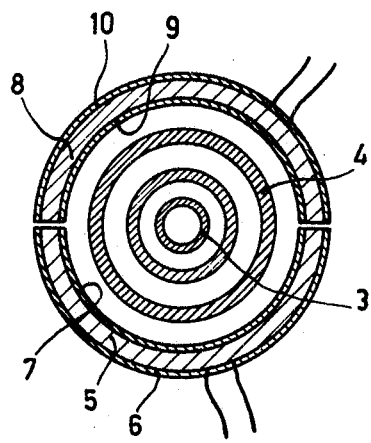

The foregoing objects and description as well as further objects and advantages of the invention will become apparent with reference to the following description and the drawings illustrating in FIG. 1 a longitudinal section view of the detuning member of the invention, and in FIG. 2 a cross sectional view of the detuning member of FIG. 1 along the section line II—II.

The detuning member, consisting of the two apertured terminal plates 1 and 2 interconnected by means of a quartz tube 3 having a cross-sectional area large enough to surround the aperture and a resilient bellows-like, widened part 4, is connected between the reflector 13 and the block 14 of insulating material in which the discharge is effected and which carries the other of the above noted reflective cavity terminator 15. Between the two terminal plates there are disposed a semi-cylinder 5 of electrostrictive material having electrodes 6 and 7 and a semi-cylinder 8 having electrodes 9 and 10. The semi-cylinders 5 and 8 are secured by means of cement between the plates 1 and 2 and have a cross-sectional area sufficient to encompass the tube 3. The apertures 11 and 12 in the semi-cylinders 5 and 8 serve for passing the supply wire to the electrodes located on the inner sides.

This construction affords the advantage that the electrostrictive material no longer forms part of the vacuum wall and, owing to the arrangement of the electrodes, any curvatures are very small and no longer influence the seal.

The parts of the electrostrictive body sheath may be secured between the two terminal plates by means of cement, or fixed between the plates by shrinkage. In either case, when carefully treated, the electrostrictive body may be replaced without opening or disturbing the discharge space of the laser.

The above cited embodiments are not intended to be limiting but exemplary only, and while we have described our invention with a specific application and embodiment thereof, other modifications will be apparent to those skilled in the art without departing from the spirit and scope of the invention.

What is claimed is:

1. In a device for producing stimulated emission with a gaseous discharge in a cavity within a block of material, said cavity terminated by reflectors, a detuning member surrounding a portion of said cavity between said terminating reflectors, said detuning member comprising, first and second apertured terminal plates, first means having a cross-sectional area exceeding the area of said apertures for flexibly interconnecting said terminal plates and surrounding said first and second plate apertures, and second means having a cross-sectional area exceeding the cross-sectional area of said first means and having the characteristic of varying dimension by means of a voltage applied thereto interconnecting said plates encompassing said first means.

2. The combination of claim 1 wherein said first means is tubular in shape.

3. In a device for producing stimulated emission with a gaseous discharge in a cavity within a block of material, said cavity terminated by reflectors, a detuning member for mounting one of said cavity terminating reflectors to said block of material, said detuning member comprising, first and second apertured terminal plates, first means having a widened resilient central portion and two end portions each having a cross-sectional area exceeding the area of said apertures and interconnecting said terminal end plates and surrounding said first and second plate apertures, and second means having a cross-sectional area exceeding the cross-sectional area of said first means and having the characteristic of varying dimension by means of a voltage applied thereto interconnecting said plates and encompassing said first means.

4. The combination of claim 1 wherein said first means is tubular and said second means includes first and second hemispherical sheaths of electrostrictive material arranged to form a cylindrical enclosure about said first means.

References Cited

UNITED STATES PATENTS

| 3,170,122 | 2/1965 | Bennett | 331—94.5 |
| 3,308,394 | 3/1967 | Snitzer et al. | 331—94.5 |

RONALD L. WIBERT, Primary Examiner

T. MAJOR, Assistant Examiner